US012810814B2

(12) United States Patent
Kwon

(10) Patent No.: US 12,810,814 B2
(45) Date of Patent: Nov. 24, 2026

(54) DISPLAY DEVICE

(71) Applicant: Samsung Display Co., Ltd., Yongin-si (KR)

(72) Inventor: Jinho Kwon, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/812,867

(22) Filed: Aug. 22, 2024

(65) Prior Publication Data

US 2025/0157414 A1 May 15, 2025

(30) Foreign Application Priority Data

Nov. 13, 2023 (KR) ........................ 10-2023-0155999

(51) Int. Cl.
*G09G 3/32* (2016.01)
*G09G 3/3275* (2016.01)

(52) U.S. Cl.
CPC ............. *G09G 3/3275* (2013.01); *G09G 3/32* (2013.01); *G09G 2310/0275* (2013.01); *G09G 2310/0291* (2013.01); *G09G 2330/023* (2013.01)

(58) Field of Classification Search
CPC ................... G09G 3/3275; G09G 3/32; G09G 2310/0275; G09G 2310/0291; G09G 2330/023; G09G 3/3266; G09G 3/20
See application file for complete search history.

(56) References Cited

U.S. PATENT DOCUMENTS

| | | | | |
|---|---|---|---|---|
| 10,692,458 | B2 | 6/2020 | Pyun et al. | |
| 10,971,066 | B2 | 4/2021 | Kwon | |
| 11,521,560 | B2 | 12/2022 | Bae et al. | |
| 2020/0252563 | A1* | 8/2020 | Yasuda | H04N 25/704 |
| 2022/0013052 | A1* | 1/2022 | Wang | G09G 3/20 |
| 2024/0233652 | A1* | 7/2024 | Yang | G09G 3/3233 |

FOREIGN PATENT DOCUMENTS

| | | | |
|---|---|---|---|
| KR | 10-2365310 | B1 | 2/2022 |
| KR | 10-2574314 | B1 | 9/2023 |

* cited by examiner

*Primary Examiner* — Michael A Faragalla
(74) *Attorney, Agent, or Firm* — Womble Bond Dickinson (US) LLP

(57) ABSTRACT

Disclosed is a display device which includes a display panel that displays an image by utilizing a data signal, a data driving circuit that supplies the data signal to the display panel through a channel, and a driving controller that controls the data driving circuit. The data driving circuit includes an output buffer that outputs the data signal to the channel, a determination circuit that is connected to the channel, receives the data signal, and determines a driving capability of the output buffer by utilizing a transition period of the data signal, and a control circuit that outputs a current control signal for adjusting a driving intensity of the output buffer to the output buffer depending on a determination result of the determination circuit.

19 Claims, 10 Drawing Sheets

DISPLAY DEVICE

CROSS-REFERENCE TO RELATED APPLICATION

The present application claims priority to and the benefit of Korean Patent Application No. 10-2023-0155999, filed on Nov. 13, 2023, in the Korean Intellectual Property Office, the entire disclosure of which is incorporated herein by reference.

BACKGROUND

1. Field

Embodiments of the present disclosure described herein relate to a display device, and more particularly, relate to a display device including a data driving circuit.

2. Description of the Related Art

A light emitting display device from among display devices displays an image by using a light emitting diode which generates a light through the recombination of electrons and holes. The light emitting display device supports a fast response speed while providing low power consumption.

The light emitting display device includes pixels connected to data lines and scan lines. Each of the pixels generally includes a light emitting element, and a pixel circuit unit for controlling the amount of current flowing to the light emitting element. In response to a data signal, the pixel circuit unit controls the amount of current flowing from a first driving voltage to a second driving voltage through the light emitting element. In this case, there is generated a light of luminance corresponding to the amount of current flowing through the light emitting element.

SUMMARY

One or more embodiments of the present disclosure may provide a display device for preventing a power from being unnecessarily consumed by optimally setting a driving capability of a data driving circuit.

According to one or more embodiments of the present disclosure, a display device includes a display panel that displays an image by utilizing a data signal, a data driving circuit that supplies the data signal to the display panel through a channel, and a driving controller that controls the data driving circuit.

The data driving circuit may include an output buffer that outputs the data signal to the channel, a determination circuit that is connected to the channel, receives the data signal, and determines a driving capability of the output buffer by utilizing a transition period of the data signal, and a control circuit that outputs a current control signal for adjusting a driving intensity of the output buffer to the output buffer depending on a determination result of the determination circuit.

In one or more embodiments, the determination circuit may include a counting circuit configured to count the transition period to output a counting value.

In one or more embodiments, the transition period may include: a rising transition period set to a time period from a first threshold point where the data signal reaches a low threshold voltage to a second threshold point where the data signal reaches a high threshold voltage; and a falling transition period set to a time period from a third threshold point where the data signal reaches the high threshold voltage to a fourth threshold point where the data signal reaches the low threshold voltage.

In one or more embodiments, the determination circuit may further include: a first comparator configured to compare the data signal and the high threshold voltage to output a first comparison result; and a second comparator configured to compare the data signal and the low threshold voltage to output a second comparison result. The counting circuit may be configured to determine a counting start point and a counting end point by utilizing the first and second comparison results.

In one or more embodiments, the counting circuit may be configured to: output a first counting value by counting a duration of the rising transition period; and output a second counting value by counting a duration of the falling transition period.

In one or more embodiments, the control circuit may be configured to: compare the first and second counting values with a threshold range; when all the first and second counting values are within the threshold range, output the current control signal with a reference value; and when at least one of the first counting value or the second counting value is outside the threshold range, output the current control signal with a compensation value different from the reference value.

In one or more embodiments, the transition period may be set to a time period from a first threshold point where the data signal reaches a low threshold voltage to a second threshold point where the data signal reaches a high threshold voltage, and the counting circuit may be configured to output the counting value by counting a duration of the transition period.

In one or more embodiments, the determination circuit may further include: a first comparator configured to compare the data signal and the high threshold voltage to output a first comparison result; and a second comparator configured to compare the data signal and the low threshold voltage to output a second comparison result. The counting circuit may be configured to determine a counting start point and a counting end point by utilizing the first and second comparison results.

In one or more embodiments, the control circuit may be configured to: compare the counting value with a threshold range; when the counting value is within the threshold range, output the current control signal with a reference value; when the counting value is outside the threshold range, output the current control signal with a compensation value different from the reference value.

In one or more embodiments, the determination circuit may be configured to receive an enable signal or a disable signal from the driving controller, to be activated in response to the enable signal, and to be deactivated in response to the disable signal.

In one or more embodiments, the data driving circuit may further include: a switching circuit configured to switch a connection between the channel and the determination circuit in response to a switching signal.

In one or more embodiments, the driving controller may be configured to provide the switching signal to the switching circuit.

In one or more embodiments, the channel may include a plurality of channels, the output buffer may include a plurality of output buffers respectively connected to the plurality of channels, and the determination circuit may be connected to some channels from among the plurality of channels.

In one or more embodiments, the determination circuit may include: a first determination circuit connected to a first channel from among the plurality of channels, and configured to output a first result value associated with a transition period of a first data signal output to the first channel; a second determination circuit connected to a second channel from among the plurality of channels, and configured to output a second result value associated with a transition period of a second data signal output to the second channel; and a third determination circuit connected to a third channel from among the plurality of channels, and configured to output a third result value associated with a transition period of a third data signal output to the third channel.

In one or more embodiments, the control circuit may be configured to: compare each of the first to third result values with a threshold range; when all of the first to third result values are within the threshold range, output the current control signal with a reference value to the plurality of output buffers; and when at least one of the first result value, the second result value, or the third result value is outside the threshold range, output the current control signal with a compensation value different from the reference value to the plurality of output buffers.

In one or more embodiments, the first and third channels may be outermost channels from among the plurality of channels, and the second channel may be a channel located at a center from among the plurality of channels.

In one or more embodiments, each of the first to third determination circuits may receive an enable signal or a disable signal from the driving controller, may be activated in response to the enable signal, and may be deactivated in response to the disable signal.

In one or more embodiments, the data driving circuit may further include: a first switching circuit configured to switch a connection between the first channel and the first determination circuit in response to a first switching signal; a second switching circuit configured to switch a connection between the second channel and the second determination circuit in response to a second switching signal; and a third switching circuit configured to switch a connection between the third channel and the third determination circuit in response to a third switching signal.

In one or more embodiments, the driving controller may be configured to provide the first to third switching signals to the data driving circuit.

In one or more embodiments, the control circuit may be configured to supply the current control signal to the plurality of output buffers in common.

BRIEF DESCRIPTION OF THE DRAWINGS

The above and other aspects and features of the present disclosure will become apparent by describing in detail embodiments thereof with reference to the accompanying drawings.

DETAILED DESCRIPTION

Figure 1:
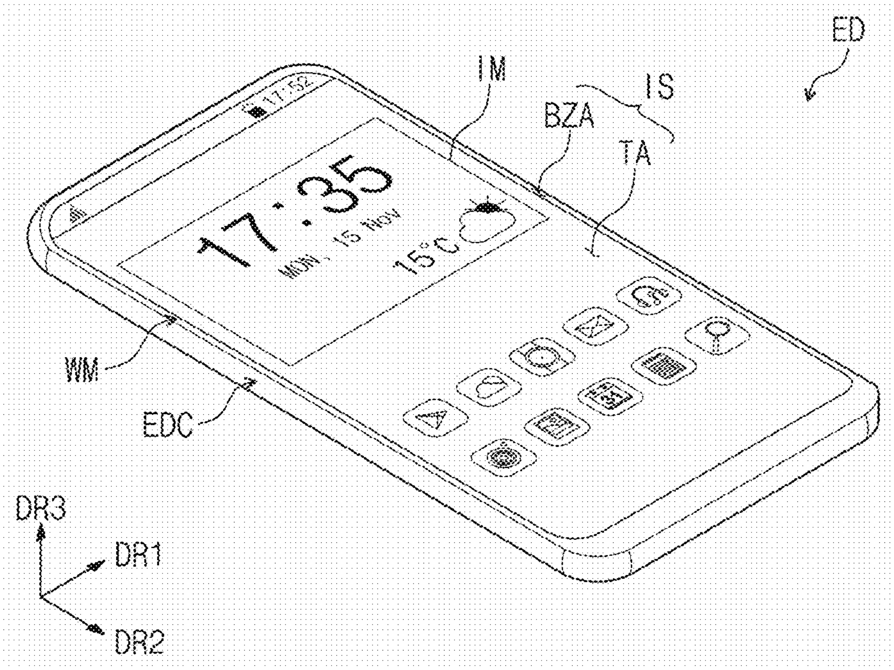
FIG. 1 is a perspective view of an electronic device according to one or more embodiments of the present disclosure.

In the specification, the expression that a first component (or an area, a layer, a part, or a portion) is "on", "connected to", or "coupled to" a second component means that the first component is directly on/connected to/coupled to the second component or means that a third component is interposed therebetween.

The same reference numerals refer to the same components. In addition, in drawings, thicknesses, proportions, and dimensions of components may be exaggerated to describe the technical features effectively. The expression "and/or" includes one or more combinations which associated components are capable of defining. For example, "A and/or B" may be understood to mean "A, B, or A and B." In the specification and the claims, the phrase "at least one of" is intended to include the meaning of "at least one selected from the group of" for the purpose of its meaning and interpretation. For example, "at least one of A and B," "at least one of A or B," or "at least one of A and/or B" may be understood to mean "A, B, or A and B."

Although the terms "first", "second", etc. may be used to describe various components, the components should not be construed as being limited by the terms. The terms are only used to distinguish one component from another component. For example, without departing from the scope and spirit of the invention, a first component may be referred to as a "second component", and similarly, the second component may be referred to as the "first component". The singular forms are intended to include the plural forms unless the context clearly indicates otherwise.

Also, the terms "under", "below", "on", "above", etc. are used to describe the correlation of components illustrated in drawings. The terms are relative and are described with respect to a direction indicated in the drawing.

It will be further understood that the terms "comprises", "includes", "have", etc. specify the presence of stated features, numbers, steps, operations, elements, components, or a combination thereof but do not preclude the presence or addition of one or more other features, numbers, steps, operations, elements, components, or a combination thereof.

Unless otherwise defined, all terms (including technical terms and scientific terms) used in the specification have the same meaning as commonly understood by one skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

A person of ordinary skill in the art would appreciate, in view of the present disclosure in its entirety, that each suitable feature of the various embodiments of the present disclosure may be combined or combined with each other, partially or entirely, and may be technically interlocked and operated in various suitable ways, and each embodiment may be implemented independently of each other or in conjunction with each other in any suitable manner unless otherwise stated or implied.

Below, embodiments of the present disclosure will be described with reference to drawings.

FIG. 1 is a perspective view of an electronic device according to one or more embodiments of the present disclosure.

Referring to FIG. 1, an electronic device ED according to one or more embodiments of the present disclosure may be in the shape of a rectangle having short sides parallel to a first direction DR1 and long sides parallel to a second direction DR2 intersecting the first direction DR1. However, the present disclosure is not limited thereto. For example, the electronic device ED may be implemented in various suitable shapes such as a circle, and a polygon, and/or the like.

The electronic device ED may be a device that is activated depending on an electrical signal. The electronic device ED may include various suitable embodiments. For example, the electronic device ED may be applied to an electronic device such as a smartphone, a smart watch, a tablet, a notebook, a computer, a smart television, and/or a navigation system, but the present disclosure is not limited thereto.

Below, the normal direction which is substantially perpendicular to a plane defined by the first direction DR1 and the second direction DR2 is defined as a third direction DR3. In the specification, expressions "when viewed from above a plane" and "in a plan view" may mean "when viewed in the third direction DR3".

An upper surface of the electronic device ED may be defined as a display surface IS and may be parallel to the plane defined by the first direction DR1 and the second direction DR2. An image or images IM generated by the electronic device ED may be provided to the user through the display surface IS.

The display surface IS may be divided into a transmission area TA and a bezel area BZA. The transmission area TA may be an area in which the image or images IM are displayed. The user visually perceives the image or images IM through the transmission area TA. In one or more embodiments, the transmission area TA is illustrated in the shape of a quadrangle whose vertexes are rounded. However, this is illustrated as an example and the present disclosure is not limited thereto. The transmission area TA may be implemented to have various suitable shapes and may not be limited to any one particular shape in one or more embodiments of the present disclosure.

The bezel area BZA is adjacent to the transmission area TA. The bezel area BZA may have a given color. The bezel area BZA may be around (or may surround) the transmission area TA. Accordingly, the shape of the transmission area TA may be defined substantially by the bezel area BZA. However, this is illustrated as an example, and the present disclosure is not limited thereto. For example, the bezel area BZA may be locate adjacent to only one side or some of the sides of the transmission area TA, or the bezel area BZA may be omitted.

The electronic device ED may sense an external input applied from the outside. The external input may include various suitable types of inputs which are provided from the outside of the electronic device ED. For example, as well as a contact by a part of the human body such as the user's hand or a contact by a separate device (e.g., an active pen and/or a digitizer), the external input may include an external input (e.g., hovering) which is applied in a state where the user's hand comes close to the electronic device ED or is adjacent to the electronic device ED within a given distance. Also, the external input may be provided in various suitable types such as a force type, a pressure type, a temperature type, and/or a light type (e.g., an optical type).

Figure 2A:
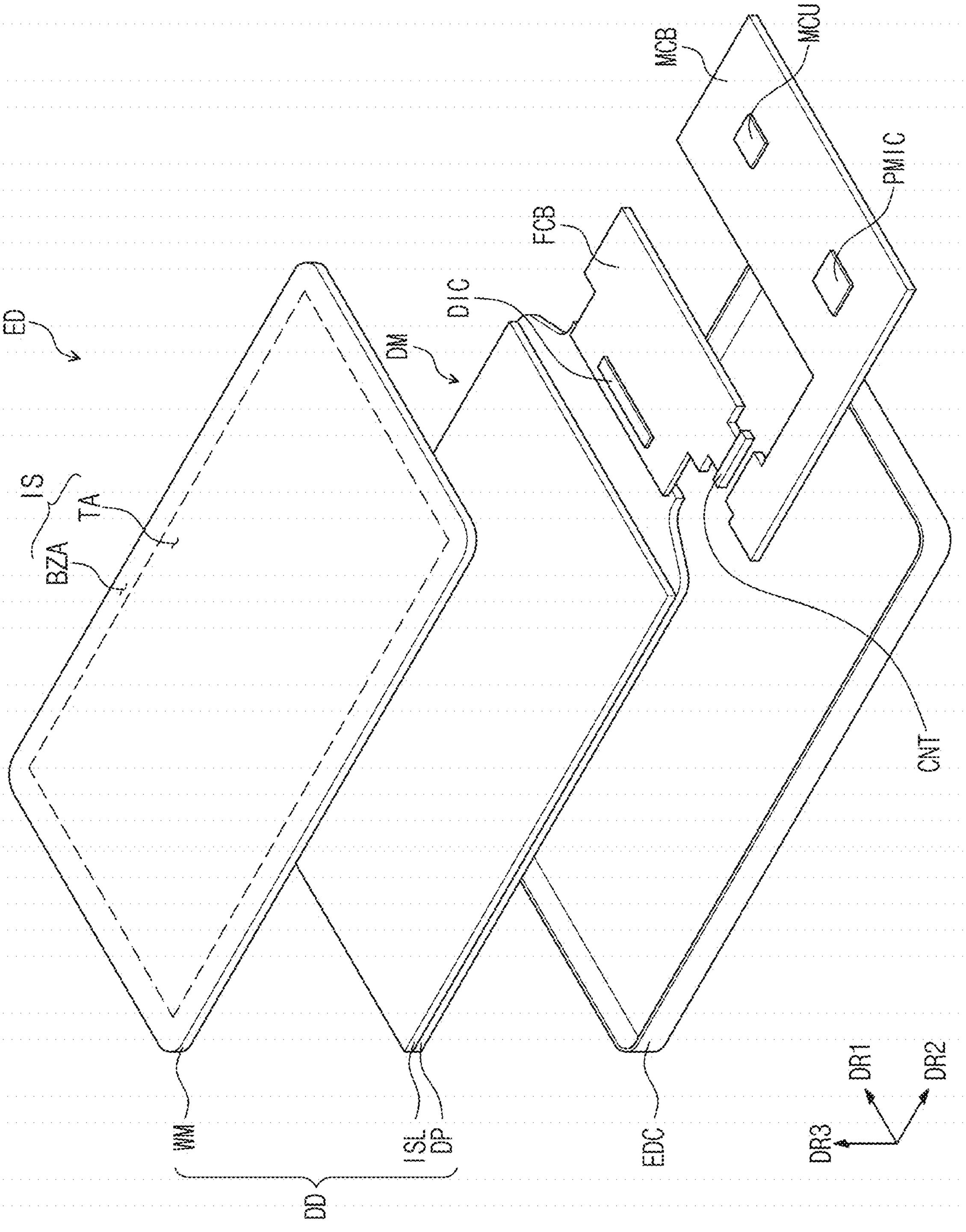
FIG. 2A is an exploded perspective view of an electronic device according to one or more embodiments of the present disclosure.
Figure 2B:
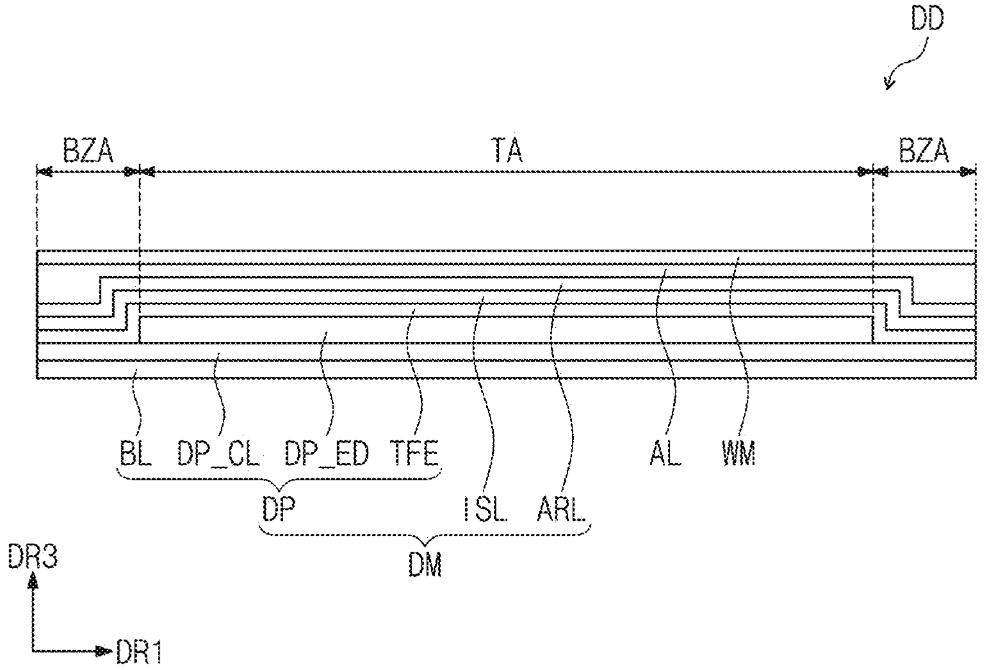
FIG. 2B is a cross-sectional view of a display device according to one or more embodiments of the present disclosure.

FIG. 2A is an exploded perspective view of an electronic device ED according to one or more embodiments of the present disclosure, and FIG. 2B is a cross-sectional view of a display device according to one or more embodiments of the present disclosure.

Referring to FIGS. 2A and 2B, the electronic device ED may include a display device DD, an electronic module, and a housing EDC. The display device DD may include a window WM and a display module DM and may be accommodated in the housing EDC. In one or more embodiments, the appearance of the electronic device ED is implemented or defined by coupling the window WM and the housing EDC.

A front surface of the window WM defines the display surface IS of the electronic device ED. The window WM may include an optically transparent material. For example, the window WM may include glass or plastic. The window WM may be implemented in a multi-layer structure or a single-layer structure. For example, the window WM may include a plurality of plastic films bonded to each other by an adhesive or may have a glass substrate and a plastic film bonded to each other by an adhesive.

The display module DM may include a display panel DP and an input sensing layer ISL. The display panel DP may display an image depending on an electrical signal, and the input sensing layer ISL may sense an external input applied from the outside. The external input may be provided in various forms.

The display panel DP according to one or more embodiments of the present disclosure may be a light emitting display panel, but is not particularly limited thereto. For example, the display panel DP may be an organic light emitting display panel, an inorganic light emitting display panel, or a quantum dot light emitting display panel. A light emitting layer of the organic light emitting display panel may include an organic light emitting material, and a light emitting layer of the inorganic light emitting display panel may include an inorganic light emitting material. A light emitting layer of the quantum dot light emitting display panel may include a quantum dot, a quantum rod, etc. Below, the description will be given as the display panel DP is an organic light emitting display panel. However, the present disclosure is not limited thereto.

Referring to FIG. 2B, the display panel DP includes a base layer BL, a circuit layer DP_CL, an element layer DP_ED, and an encapsulation layer TFE. The display panel DP according to one or more embodiments of the present disclosure may be a flexible display panel. However, the present disclosure is not limited thereto. For example, the display panel DP may be a foldable display panel, which is folded about a folding axis, or a rigid display panel.

The base layer BL may include a synthetic resin layer. The synthetic resin layer may be a polyimide-based resin layer, and the material thereof is not particularly limited. Besides, the base layer BL may include a glass substrate, a metal substrate, an organic/inorganic composite material substrate, etc.

The circuit layer DP_CL is disposed on the base layer BL. The circuit layer DP_CL is disposed between the base layer BL and the element layer DP_ED. The circuit layer DP_CL includes at least one insulating layer and a circuit element. Below, the insulating layer included in the circuit layer DP_CL may be referred to as an "intermediate insulating layer". The intermediate insulating layer includes at least one intermediate inorganic film and at least one intermediate organic film. The circuit element may include a pixel driving circuit included in each of a plurality of pixels for displaying an image and a sensor driving circuit included in each of a plurality of sensors for recognizing external information. The external information may be biometric information. As an example of one or more embodiments according to the present disclosure, the sensor may include a fingerprint recognition sensor, a proximity sensor, an iris recognition sensor, a blood pressure measurement sensor, an illumination sensor, and/or the like. Also, the sensor may include an optical sensor that recognizes biometric information by utilizing (or using using) an optical method. The circuit layer DP_CL may further include signal lines connected to the pixel driving circuit and/or the sensor driving circuit.

The element layer DP_ED may include a light emitting element included in each of the pixels and a light receiving element included in each of the sensors. As an example of the present disclosure, the light receiving element may be a photodiode. The light receiving element may be a sensor that senses a light reflected by a fingerprint of the user or reacts to a light.

The encapsulation layer TFE seals up the element layer DP_ED. The encapsulation layer TFE may include at least one organic film and at least one inorganic film. The inorganic film may include an inorganic material and may protect the element layer DP_ED from moisture/oxygen. The inorganic layer may include a silicon nitride layer, a silicon oxy nitride layer, a silicon oxide layer, a titanium oxide layer, an aluminum oxide layer, and/or the like, but is not particularly limited thereto. The organic film may include an organic material and may protect the element layer DP_ED from foreign objects such as dust particles.

The input sensing layer ISL may be formed on the display panel DP. The input sensing layer ISL may be directly disposed on the encapsulation layer TFE. According to one or more embodiments of the present disclosure, the input sensing layer ISL may be formed on the display panel DP through the same or substantially the same process as the display panel DP. That is, when the input sensing layer ISL is directly disposed on the display panel DP, an adhesive film may not be disposed between the input sensing layer ISL and the encapsulation layer TFE. Alternatively, an adhesive film may be disposed between the input sensing layer ISL and the display panel DP. In this case, the input sensing layer ISL may not be manufactured by the same or substantially the same process as the display panel DP. For example, the input sensing layer ISL may be manufactured through a process independent of that of the display panel DP and may then be fixed on the upper surface of the display panel DP by the adhesive film.

The input sensing layer ISL may sense an external input (e.g., a touch of the user), may change the sensed input into a given input signal, and may provide the input signal to the display panel DP. The input sensing layer ISL may include a plurality of sensing electrodes for sensing an external input. The sensing electrodes may sense the external input by utilizing (or using) a capacitive method. The display panel DP may receive an input signal from the input sensing layer ISL and may generate an image corresponding to the input signal.

The display module DM may further include an anti-reflection layer ARL. The anti-reflection layer ARL reduces or minimizes the reflectance of an external light incident from above the window WM. As an example according to one or more embodiments of the present disclosure, the anti-reflection layer ARL may be disposed on the input sensing layer ISL. However, the present disclosure is not limited thereto. The anti-reflection layer ARL may be disposed between the display panel DP and the input sensing layer ISL. The anti-reflection layer ARL may include a plurality of color filters and a black matrix. The arrangement of the color filters may be determined in consideration of colors of lights generated from a plurality of pixels PX (e.g., refer to FIG. 3) included in the display panel DP. Alternatively, the anti-reflection layer ARL may include a phase retarder and a polarizer. The phase retarder may be implemented in a film type or a liquid crystal coating type and may include a λ/2 phase retarder and/or a λ/4 phase retarder. The polarizer may also be implemented in a film type or a liquid crystal coating type. The polarizer of the film type may include a stretch-type synthetic resin film, and the polarizer of the liquid crystal coating type may include liquid crystals arranged in a given direction. The phase retarder and the polarizer may be implemented with one polarization film.

The display device DD according to one or more embodiments of the present disclosure may further include an adhesive layer AL. The window WM may be attached to the anti-reflection layer ARL by the adhesive layer AL. The adhesive layer AL may include an optical clear adhesive, an optically clear adhesive resin, and/or a pressure sensitive adhesive (PSA).

The display module DM may further include a display driving circuit DIC (or a display driving chip) and a flexible circuit film FCB. According to one or more embodiments of the present disclosure, the display driving circuit DIC may be implemented in the form of a chip (e.g., an integrated chip) and may be mounted on the flexible circuit film FCB. However, the present disclosure is not limited thereto. Alternatively, the display driving circuit DIC may be disposed on the display panel DP. The display driving circuit DIC may include a data driving circuit 200 (e.g., refer to FIG. 3) that provides a data signal to the display panel DP. Alternatively, the display driving circuit DIC may further include a driving controller 100 (e.g., refer to FIG. 3) that controls a driving operation of the data driving circuit 200. That is, the display driving circuit DIC may be implemented in the form of a chip (e.g., an integrated chip) where the data driving circuit 200 and the driving controller 100 are integrally formed.

The flexible circuit film FCB may be coupled to the display panel DP. The flexible circuit film FCB may be coupled to one end portion of the display panel DP such that the display driving circuit DIC is electrically connected to the display panel DP.

The display module DM may further include a touch driving circuit that is mounted on the flexible circuit film FCB and is electrically connected to the input sensing layer ISL.

The electronic module may include a main circuit board MCB. According to one or more embodiments of the present disclosure, the main circuit board MCB may be electrically connected to the flexible circuit film FCB through a connector CNT. A main processor MCU and a power management integrated circuit PMIC (or a power management chip) may be provided on the main circuit board MCB. The main processor MCU and the power management integrated circuit PMIC, for example, may be electrically connected to the display driving circuit DIC through the connector CNT.

The main processor MCU may control an overall operation of the electronic device ED. The main processor MCU may include one or more of a central processing unit (CPU) and/or an application processor (AP). The main processor MCU may further include one or more of a graphic processing unit (GPU), a communication processor (CP), and/or an image signal processor (ISP). The main processor MCU may provide the display driving circuit DIC with an image signal utilized (or used) to display an image and various kinds of control signals.

The power management integrated circuit PMIC may receive an external power (e.g., a battery voltage). As an example, the power management integrated circuit PMIC may generate a voltage to be supplied to the display device DD based on the external power. The power management integrated circuit PMIC may include at least one regulator. The at least one regulator may generate output voltages of various suitable voltage levels based on the external power.

A structure in which the power management integrated circuit PMIC is mounted on the main circuit board MCB in the form of a chip (e.g., an integrated chip) is illustrated in FIG. 2A, but the present disclosure is not limited thereto. For example, the power management integrated circuit PMIC may be mounted on the flexible circuit film FCB in the form of a chip (e.g., an integrated chip), that is, may be provided as a component included in the display device DD.

The electronic module may further include one or more of various functional modules, for example, a camera module, a sensor module, and/or the like, as well as the main circuit board MCB, the main processor MCU, and/or the power management integrated circuit PMIC.

The housing EDC is coupled to the window WM. The housing EDC is coupled to the window WM to provide a suitable inner space (e.g., a given inner space). The display device DD and the electronic module may be accommodated in the inner space of the housing EDC. The housing EDC may include a material whose rigidity is relatively high. For example, the housing EDC may include glass, plastic, and/or metal, and/or may include a plurality of frames and/or plates that are formed of a combination thereof. The housing EDC may stably protect the components of the display device DD and the electronic module accommodated in the inner space from an external impact.

In one or more embodiments, a battery module which supplies a power necessary for the overall operation of the display device DD may be disposed between the display module DM and the housing EDC.

Figure 3:
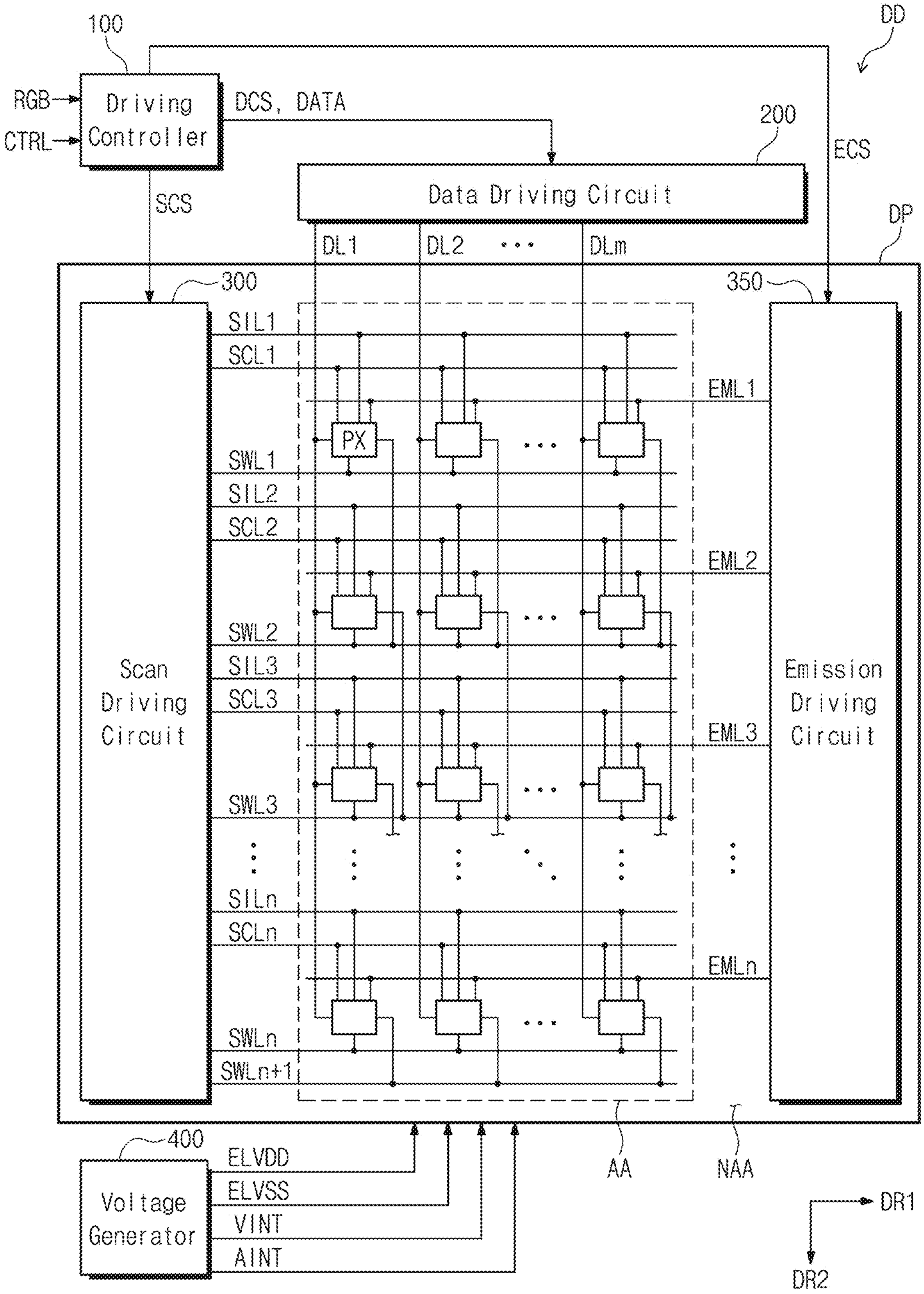
FIG. 3 is a block diagram of a display device according to one or more embodiments of the present disclosure.

FIG. 3 is a block diagram of a display device according to one or more embodiments of the present disclosure.

Referring to FIG. 3, the display device DD includes the display panel DP, the driving controller 100, the data driving circuit 200, a scan driving circuit 300, an emission driving circuit 350, and a voltage generator 400.

The driving controller 100 receives an input image signal RGB and a control signal CTRL from the main processor MCU (e.g., refer to FIG. 2A). The driving controller 100 generates image data DATA by converting a data format of the input image signal RGB in compliance with the specification for an interface with the data driving circuit 200. The control signal CTRL may include a vertical synchronization signal, an input data enable signal, a master clock signal, and/or the like. The driving controller 100 generates a first driving control signal (e.g., a scan control signal) SCS, a second driving control signal DCS, and a third driving control signal (e.g., an emission control signal) ECS based on the control signal CTRL.

The data driving circuit 200 receives the second driving control signal DCS and the image data DATA from the driving controller 100. The data driving circuit 200 converts the image data DATA to data signals and outputs the data signals to a plurality of data lines DL1 to DLm to be described later. The data signals refer to analog voltages corresponding to gray values (e.g., gray level values) of the image data DATA. Herein, "m" is an integer of 1 or greater.

The scan driving circuit 300 receives the first driving control signal SCS from the driving controller 100. The scan driving circuit 300 may output scan signals to scan lines in response to the first driving control signal SCS.

The voltage generator 400 generates voltages utilized (or used) for an operation of the display panel DP. In one or more embodiments, the voltage generator 400 generates a first driving voltage ELVDD, a second driving voltage ELVSS, a first initialization voltage VINT, and a second initialization voltage AINT.

The display panel DP includes initialization scan lines SIL1 to SILn, compensation scan lines SCL1 to SCLn, write scan lines SWL1 to SWLn+1, emission control lines EML1 to EMLn, and the data lines DL1 to DLm. The initialization scan lines SIL1 to SILn, the compensation scan lines SCL1 to SCLn, the write scan lines SWL1 to SWLn+1, the emission control lines EML1 to EMLn, the data lines DL1 to DLm, and the pixels PX may overlap (e.g., may be located in) an effective area AA. The initialization scan lines SIL1 to SILn, the compensation scan lines SCL1 to SCLn, the write scan lines SWL1 to SWLn+1, and the emission control lines EML1 to EMLn extend in the first direction DR1. The initialization scan lines SIL1 to SILn, the compensation scan lines SCL1 to SCLn, the write scan lines SWL1 to SWLn+1, and the emission control lines EML1 to EMLn are spaced from each other along the second direction DR2. The data lines DL1 to DLm extend in the second direction DR2 and are spaced from each other along the first direction DR1. Herein, "n" is an integer of 1 or greater.

The plurality of pixels PX is electrically connected to the initialization scan lines SIL1 to SILn, the compensation scan lines SCL1 to SCLn, the write scan lines SWL1 to SWLn+1, the emission control lines EML1 to EMLn, and the data lines DL1 to DLm. Each of the plurality of pixels PX may be electrically connected to four scan lines. For example, the pixels PX belonging to the first row may be connected to the first initialization scan line SIL1, the first compensation scan line SCL1, and the first and second write scan lines SWL1 and SWL2. Also, the pixels PX belonging to the second row may be connected to the second initialization scan line SIL2, the second compensation scan line SCL2, and the second and third write scan lines SWL2 and SWL3. However, the number of scan lines connected to each pixel PX may be variously changed or modified, and the present disclosure is not limited thereto. In one or more other embodiments, each of the plurality of pixels PX may be electrically connected to five scan lines; in this case, the display panel DP may further include black scan lines.

The scan driving circuit 300 may be disposed in a non-effective area NAA of the display panel DP. The scan driving circuit 300 receives the first driving control signal SCS from the driving controller 100. In response to the first driving control signal SCS, the scan driving circuit 300 may output initialization scan signals to the initialization scan lines SIL1 to SILn, may output compensation scan signals to the compensation scan lines SCL1 to SCLn, and may output write scan signals to the write scan lines SWL1 to SWLn+1.

The emission driving circuit 350 receives the third driving control signal ECS from the driving controller 100. The emission driving circuit 350 may output emission control signals to the emission control lines EML1 to EMLn in response to the third driving control signal ECS. In one or more embodiments, the scan driving circuit 300 may be connected to the emission control lines EML1 to EMLn. In this case, the scan driving circuit 300 may output the emission control signals to the emission control lines EML1 to EMLn, and the emission driving circuit 350 may be omitted.

Each of the plurality of pixels PX may include a light emitting element and a pixel circuit unit for controlling the emission of the light emitting element. The pixel circuit unit may include a plurality of transistors and a capacitor. The scan driving circuit 300 and the emission driving circuit 350 may include transistors formed through the same or substantially the same process as the transistors of the pixel circuit unit.

Each of the plurality of pixels PX receives the first driving voltage ELVDD, the second driving voltage ELVSS, the first initialization voltage VINT, and the second initialization voltage AINT from the voltage generator 400.

Figure 4:
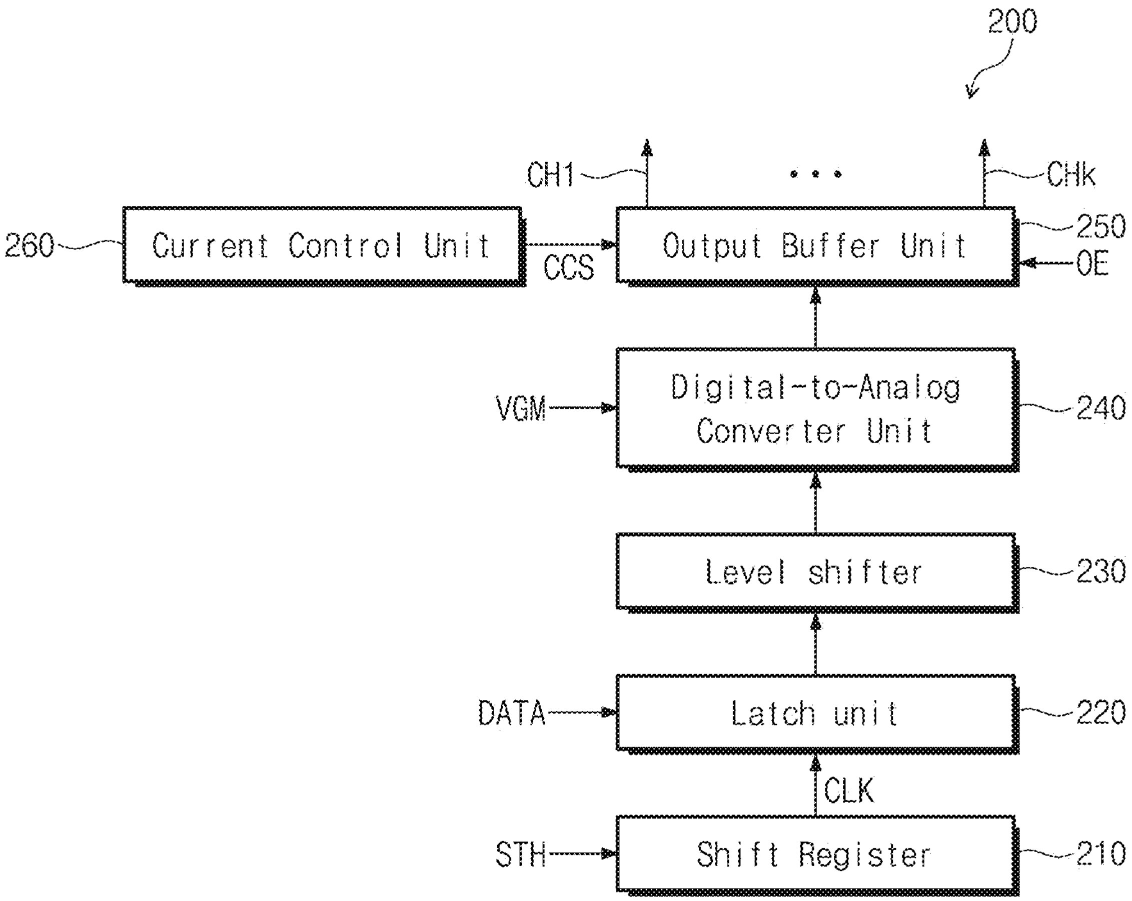
FIG. 4 is a block diagram of a data driving circuit according to one or more embodiments of the present disclosure.

FIG. 4 is a block diagram of a data driving circuit according to one or more embodiments of the present disclosure.

Referring to FIG. 4, the data driving circuit 200 includes a shifter register 210, a latch unit 220, a level shifter 230, a digital-to-analog converter unit 240, an output buffer unit 250, and a current control unit 260.

The shifter register 210 may initiate an operation in response to a horizontal start signal STH and may sequentially output a data clock signal CLK. The horizontal start signal STH may be a signal included in the second driving control signal DCS (e.g., refer to FIG. 3) provided from the driving controller 100 (e.g., refer to FIG. 3).

The data clock signal CLK output from the shifter register 210 may be provided to the latch unit 220. The latch unit 220 receives the image data "DATA" from the driving controller 100 (e.g., refer to FIG. 3) in a serial form and sequentially stores image data in response to the data clock signal CLK. In one or more embodiments, "k" image data respectively corresponding to "k" channels CH1 to CHk of the data driving circuit 200 may be stored in the latch unit 220. For convenience of description, the "k" image data stored in the latch unit 220 may be referred to as a "plurality of latch data". Here, 'k' may be an integer of 1 or greater. The number of channels CH1 to CHk, denoted as "k", may be equal to or less than the number of data lines DL1 to DLm (e.g., refer to FIG. 3), denoted as "m". For example, "k" may be equal to "m" or may be ½ of "m". However, the present disclosure is not limited thereto. Alternatively, "k" may be ⅓ or ¼ of "m".

The latch unit 220 may output the plurality of latch data in parallel. Herein, that a plurality of image data is received in a serial form means that the plurality of image data corresponding to a plurality of pixels is sequentially received one by one, and that a plurality of image data is output in a parallel form means that the plurality of image data corresponding to a plurality of pixels is output concurrently (e.g., simultaneously or at the same time).

The level shifter 230 may receive the plurality of latch data from the latch unit 220 and may respectively output a plurality of level shift data by shifting levels of the plurality of latch data. Each of the plurality of level shift data may be p-bit digital data. Here, "p" may be an integer of 1 or greater.

The digital-to-analog converter unit 240 receives the plurality of level shift data from the level shifter 230. The digital-to-analog converter unit 240 converts the plurality of level shift data of a digital form into data signals of an analog form. The digital-to-analog converter unit 240 may receive a gamma reference voltage VGM and may convert the plurality of level shift data into the data signals based on the gamma reference voltage VGM. Each of the data signals may be a voltage signal whose voltage level is differently determined depending on a gray level.

The data signals generated from the digital-to-analog converter unit 240 are provided to the output buffer unit 250. The output buffer unit 250 may be connected to the channels CH1 to CHk and may output the data signals to the channels CH1 to CHk in response to an output enable signal OE. The output enable signal OE may be a signal included in the second driving control signal DCS (e.g., refer to FIG. 3) provided from the driving controller 100 (e.g., refer to FIG. 3).

The current control unit 260 may provide a current control signal CCS to the output buffer unit 250. The output buffer unit 250 may include a plurality of output buffers respectively connected to the channels CH1 to CHk. The current control unit 260 may adjust a driving intensity of each of the plurality of output buffers by providing the current control signal CCS to the plurality of output buffers in common.

Figure 5:
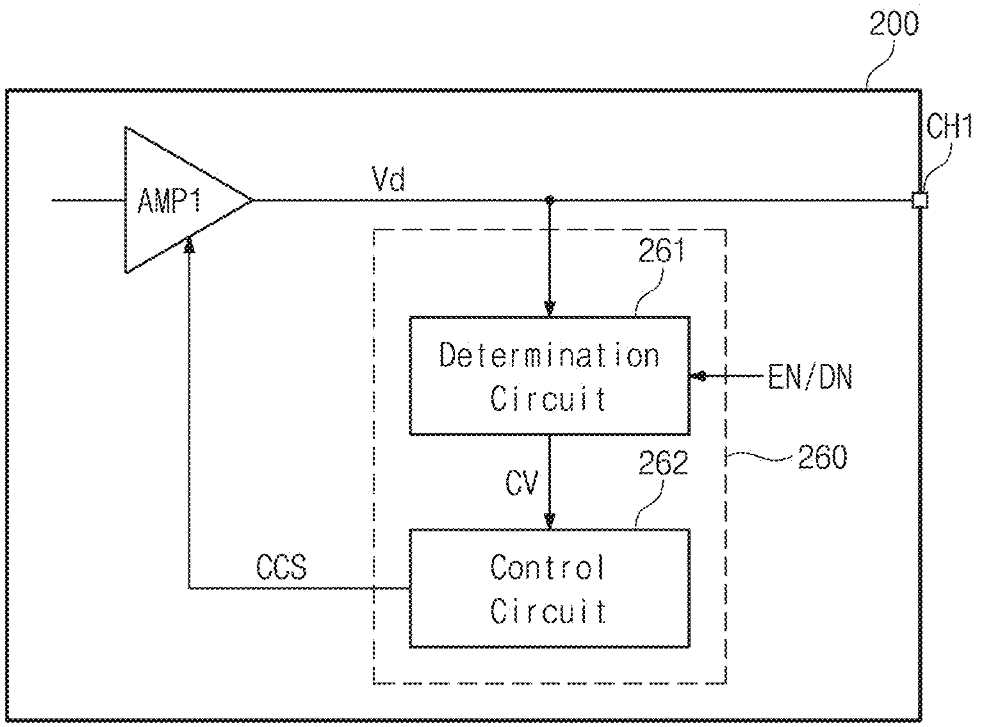
FIG. 5 is a block diagram illustrating an output buffer unit and a current control unit illustrated in FIG. 4.
Figure 6A:
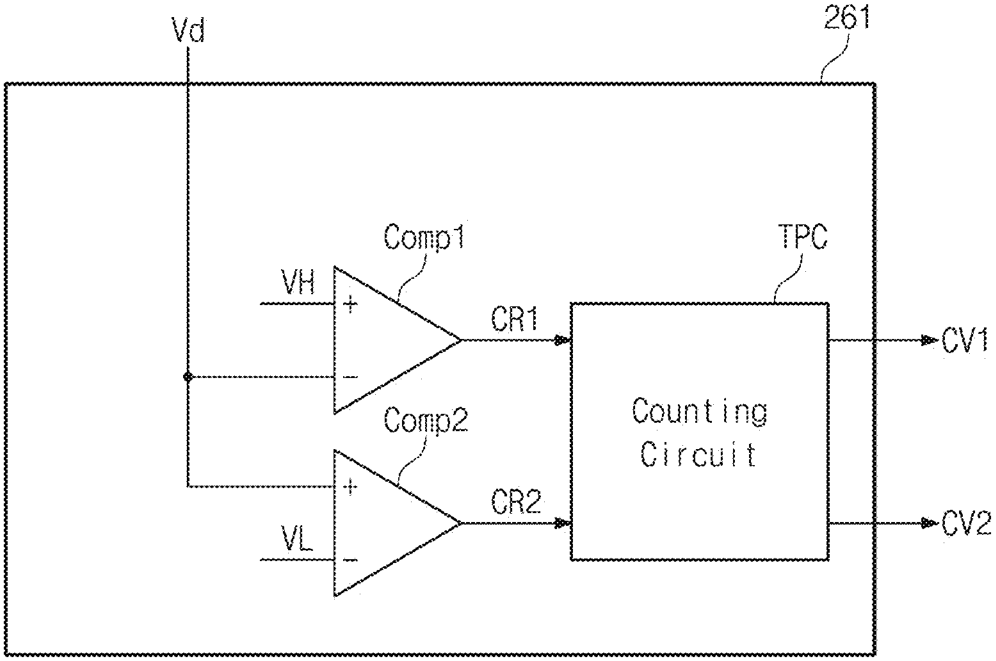
FIG. 6A is an internal block diagram of a determination circuit illustrated in FIG. 5.
Figure 6B:
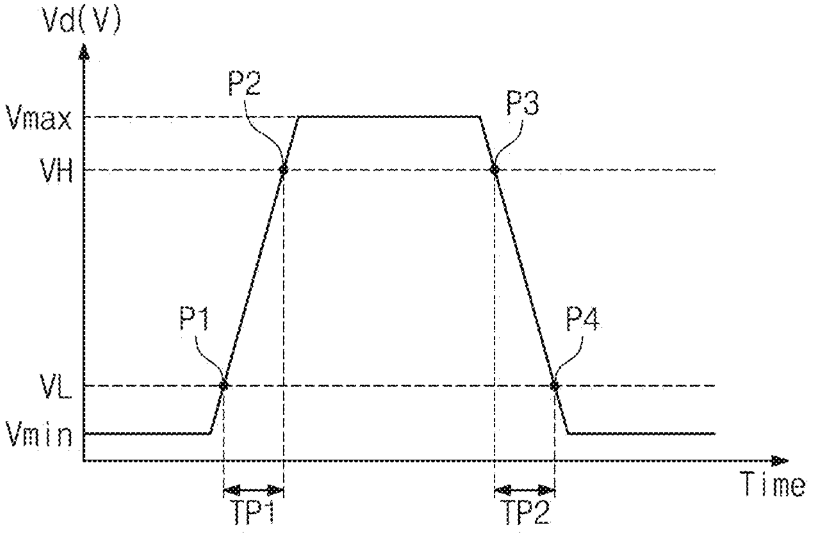
FIG. 6B is a waveform diagram illustrating first and second transition periods and a data signal illustrated in FIG. 6A.

FIG. 5 is a block diagram illustrating an output buffer unit and a current control unit illustrated in FIG. 4. FIG. 6A is an internal block diagram of a determination circuit illustrated in FIG. 5. FIG. 6B is a waveform diagram illustrating first and second transition periods and a data signal illustrated in FIG. 6A.

Referring to FIG. 5, the current control unit 260 includes a determination circuit 261 and a control circuit 262. A structure in which the current control unit 260 is connected to one (e.g., the first channel CH1) of the plurality of channels CH1 to CHk is illustrated in FIG. 5 as an example. However, the present disclosure is not limited thereto. For example, some or all of the plurality of channels CH1 to CHk may be connected to the current control unit 260.

The determination circuit 261 is connected to the first channel CH1 to receive a data signal Vd and determines the driving capability of a first output buffer AMP1 (e.g., of the output buffer unit 250) by utilizing (or using) a transition period of the data signal Vd. According to one or more embodiments of the present disclosure, the determination circuit 261 may receive an enable signal EN or a disable signal DN from the driving controller 100 (e.g., refer to FIG. 3). The determination circuit 261 may be activated in response to the enable signal EN and may be deactivated in response to the disable signal DN. The enable signal EN and the disable signal DN may be signals that are activated or deactivated by selection of the user or the operator. For example, when the operator selects an option for activating the determination circuit 261 for the purpose of the initial setting of the current control signal CCS to be supplied to the output buffer unit 250, the determination circuit 261 may be activated in response to the enable signal EN. Afterwards, after the initial setting ends, when the operator deselects the option, the determination circuit 261 may be deactivated in response to the disable signal DN. Even though the determination circuit 261 is in a deactivated state, the current control signal CCS of the initial setting state may continue to be provided to the output buffer unit 250. This may mean that the output buffer unit 250 continues to operate with the driving intensity corresponding to the current control signal CCS of the initial setting state.

Alternatively, the enable signal EN may be activated every preset period, that is, periodically. In this case, the determination circuit 261 may periodically determine the driving capability of the output buffer unit 250.

The control circuit 262 may output the current control signal CCS for adjusting the driving intensity of the first output buffer AMP1 to the first output buffer AMP1 (e.g., of the output buffer unit 250) depending on a determination result. Even though the current control unit 260 is connected to the first channel CH1 and determines the driving capability of the first output buffer AMP1 (i.e., only determines the driving capability of one output buffer) based on the data signal Vd, the current control signal CCS may be supplied to the remaining output buffers in common, as well as the first output buffer AMP1.

Referring to FIGS. 6A and 6B, the determination circuit 261 may include a counting circuit TPC, a first comparator Comp1, and a second comparator Comp2. The counting circuit TPC may count the transition period of the data signal Vd and may output a counting result (i.e., a counting value CV) to the control circuit 262.

According to one or more embodiments of the present disclosure, the transition period may include a rising transition period TP1 and a falling transition period TP2. The rising transition period TP1 may be set to a time period from a first threshold point P1 at which the data signal Vd reaches a low threshold voltage VL to a second threshold point P2 at which the data signal Vd reaches a high threshold voltage VH. The falling transition period TP2 may be set to a time period from a third threshold point P3 at which the data signal Vd reaches the high threshold voltage VH to a fourth threshold point P4 at which the data signal Vd reaches the low threshold voltage VL. The low threshold voltage VL may be lower than the high threshold voltage VH. According to one or more embodiments of the present disclosure, the low threshold voltage VL may be higher than a minimum voltage Vmin that the data signal Vd is capable of having, and the high threshold voltage VH may be lower than a maximum voltage Vmax that the data signal Vd is capable of having. However, the present disclosure may not be limited thereto. For example, the low threshold voltage VL may be identical to the minimum voltage Vmin of the data signal Vd, and the high threshold voltage VH may be identical to the maximum voltage Vmax of the data signal Vd.

The first comparator Comp1 compares the data signal Vd and the high threshold voltage VH to output a first comparison result CR1, and the second comparator Comp2 compares the data signal Vd and the low threshold voltage VL to output a second comparison result CR2. For example, when the data signal Vd is lower than the high threshold voltage VH, the first comparison result CR1 may have a state of logic "1"; when the data signal Vd is higher than the high threshold voltage VH, the first comparison result CR1 may have a state of logic "0". When the data signal Vd is higher than the low threshold voltage VL, the second comparison result CR2 may have a state of logic "1"; when the data signal Vd is lower than the low threshold voltage VL, the second comparison result CR2 may have a state of logic "0".

When all the first and second comparison results CR1 and CR2 are in a state of logic "1", the counting operation of the counting circuit TPC may be activated. The counting circuit TPC may initiate the counting operation at the first threshold point P1 at which the data signal Vd reaches the low threshold voltage VL and may terminate the counting operation at the second threshold point P2 at which the data signal Vd reaches the high threshold voltage VH. That is, in the rising transition period TP1, the first threshold point P1 may be a counting start point, and the second threshold point P2 may be a counting end point. Also, the counting circuit TPC may again initiate the counting operation at the third threshold point P3 at which the data signal Vd reaches the high threshold voltage VH and may terminate the counting operation at the fourth threshold point P4 at which the data signal Vd reaches the low threshold voltage VL. That is, in the falling transition period TP2, the third threshold point P3 may be a counting start point, and the fourth threshold point P4 may be a counting end point.

When the counting circuit TPC performs the counting operation in the rising transition period TP1 and the falling transition period TP2, the counting value CV (e.g., refer to FIG. 5) that the counting circuit TPC outputs may include a first counting value CV1 and a second counting value CV2. Herein, the first counting value CV1 corresponds to a result of counting the duration of the rising transition period TP1, and the second counting value CV2 corresponds to a result of counting the duration of the falling transition period TP2.

In the described embodiment, the first and second counting values CV1 and CV2 may be provided to the control circuit 262, and the control circuit 262 may generate the current control signal CCS based on the first and second counting values CV1 and CV2. In detail, the control circuit 262 may compare the first and second counting values CV1 and CV2 with a threshold range (e.g., a preset threshold range) and may adjust the current control signal CCS depending on comparison results. When all the first and second counting values CV1 and CV2 are included in the threshold range, the control circuit 262 may output the current control signal CCS with a reference value (e.g., a preset reference value). According to one or more embodiments, when at least one of the first and second counting values CV1 and CV2 (i.e., at least one of the first counting value CV1 or the second counting value CV2) is out of (or outside) the threshold range, the control circuit 262 may output the current control signal CCS with a compensation value different from the reference value. For example, when at least one of the first and second counting values CV1 and CV2 is higher than the threshold range (i.e., when the first counting value CV1 and/or the second counting value CV2 is higher than the threshold range), the compensation value may be greater than the reference value.

According to one or more embodiments, that the first and second counting values CV1 and CV2 exist (or are) within the threshold range means that the duration of each of the rising transition period TP1 and the falling transition period TP2 exists (or is) within a threshold time range (e.g., a preset threshold time range). That is, as the duration of each of the rising transition period TP1 and the falling transition period TP2 becomes shorter, the first output buffer AMP1 may change the data signal Vd to a desired level within a shorter time, which is regarded as the first output buffer AMP1 has a higher driving capability. Because the first output buffer AMP1 has a higher driving capability, there may be no need to adjust the current control signal CCS for the purpose of compensating for the driving capability of the first output buffer AMP1; in this case, the current control signal CCS may be maintained at the reference value.

According to one or more embodiments, that at least one of the first and second counting values CV1 and CV2 (i.e., at least one of the first counting value CV1 or the second counting value CV2) is out of (or outside) the threshold range means that the duration of at least one of the rising transition period TP1 or the falling transition period TP2 is out of (or outside) the threshold time range (e.g., the preset threshold time range). That is, as the duration of at least one of the rising transition period TP1 or the falling transition period TP2 becomes longer, a time taken for the first output buffer AMP1 to change the data signal Vd to a desired level may increase, which is regarded as the first output buffer AMP1 has a lower driving capability. Because the first output buffer AMP1 has a lower driving capability, there may be a need to adjust the current control signal CCS for the purpose of compensating for the driving capability of the first output buffer AMP1; in this case, the current control signal CCS may have the compensation value higher than the reference value.

The data driving circuit 200 may further include a lookup table in which a compensation value of the current control signal CCS is stored for each magnitude of the counting value CV. Accordingly, when at least one of the first and second counting values CV1 and CV2 (i.e., at least one of the first counting value CV1 or the second counting value CV2) is out of (or outside) the threshold range, the control circuit 262 may obtain a compensation value corresponding to the counting value being out of (or outside) the threshold range with reference to the lookup table and may adjust the current control signal CCS so as to have the obtained compensation value.

When the first output buffer AMP1 receives the current control signal CCS with the compensation value, the driving capability of the first output buffer AMP1 may be compensated for, and thus, the duration of each of the rising transition period TP1 and the falling transition period TP2 may be adjusted to belong to the threshold time range. Because, as well as the first output buffer AMP1, the remaining output buffers receive the current control signal CCS with the compensation value, the driving capabilities of the remaining output buffers may be compensated for together. Accordingly, the rising transition period TP1 and the falling transition period TP2 of each of data signals output to the channels CH1 to CHk may have the duration within (or existing within) the threshold time range.

As described above, as the current control unit 260 is connected to some or all of the channels CH1 to CHk of the data driving circuit 200, the current control unit 260 may directly measure the driving capability of the data driving circuit 200. Also, as the driving capability of the data driving circuit 200 is compensated for based on a measured result, the data driving circuit 200 may drive the channels CH1 to CHk (or data signals/lines) with an optimal (or improved) driving intensity (e.g., the driving intensity of the data driving circuit 200 may be optimized (or improved)). Also, when the data driving circuit 200 operates with the optimal or improved driving intensity, a power may be prevented from being unnecessarily consumed. This may mean that power consumption is optimized or reduced.

The case where the determination circuit 261 outputs the first and second counting values CV1 and CV2 respectively corresponding to the rising transition period TP1 and the falling transition period TP2 is illustrated in FIGS. 6A and 6B, but the present disclosure is not limited thereto. For example, the determination circuit 261 may only output a counting value corresponding to either the rising transition period TP1 or the falling transition period TP2.

Figure 7:
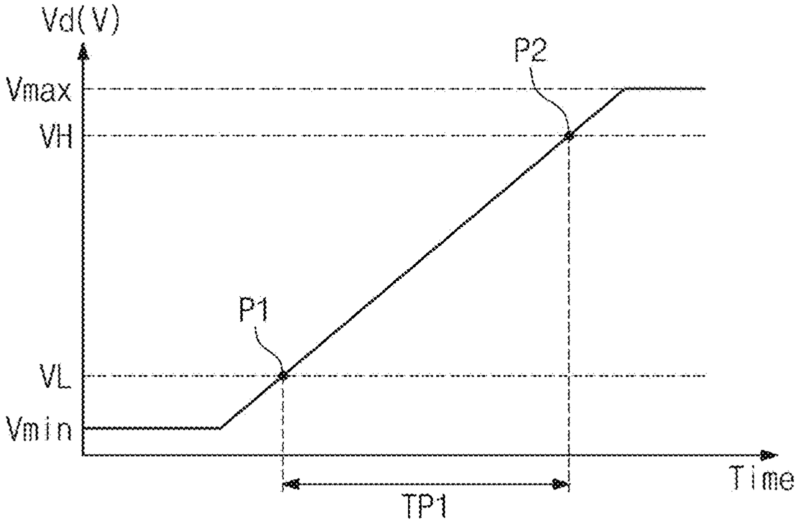
FIG. 7 is a waveform diagram illustrating a data signal and a transition period according to one or more embodiments of the present disclosure.

FIG. 7 is a waveform diagram illustrating a data signal and a transition period according to one or more embodiments of the present disclosure.

Referring to FIGS. 5-7, only when all (or both) the first and second comparison results CR1 and CR2 are in a state of logic "1" and the first comparison result CR1 transitions from logic "0" to logic "1" (i.e., only in the rising transition period TP1), the counting operation of the counting circuit TPC may be activated. That is, even though all (or both) the first and second comparison results CR1 and CR2 are in a state of logic "1", when the first comparison result CR1 transitions from logic "1" to logic "0" (i.e., in the falling transition period TP2), the counting operation of the counting circuit TPC may not be activated.

The counting circuit TPC may initiate the counting operation at the first threshold point P1 at which the data signal Vd reaches the low threshold voltage VL and may terminate the counting operation at the second threshold point P2 at which the data signal Vd reaches the high threshold voltage VH. That is, in the rising transition period TP1, the first threshold point P1 may be a counting start point, and the second threshold point P2 may be a counting end point. Also, the counting operation of the counting circuit TPC may not be activated in the falling transition period TP2.

When the counting circuit TPC performs the counting operation only in the rising transition period TP1, the counting circuit TPC may only output one counting value CV. Herein, the counting value CV corresponds to a result of counting the duration of the rising transition period TP1.

In the described embodiment, the counting value CV may be provided to the control circuit 262, and the control circuit 262 may generate the current control signal CCS based on the counting value CV. For example, the control circuit 262 may compare the counting value CV with a preset threshold range and may adjust the current control signal CCS depending on a comparison result. When the counting value CV exists (or is) within the threshold range, the control circuit 262 may output the current control signal CCS with a reference value (e.g., a preset reference value). According to one or more embodiments, when the counting value CV is out of (or outside) the threshold range, the control circuit 262 may output the current control signal CCS with a compensation value different from the reference value.

Figure 8:
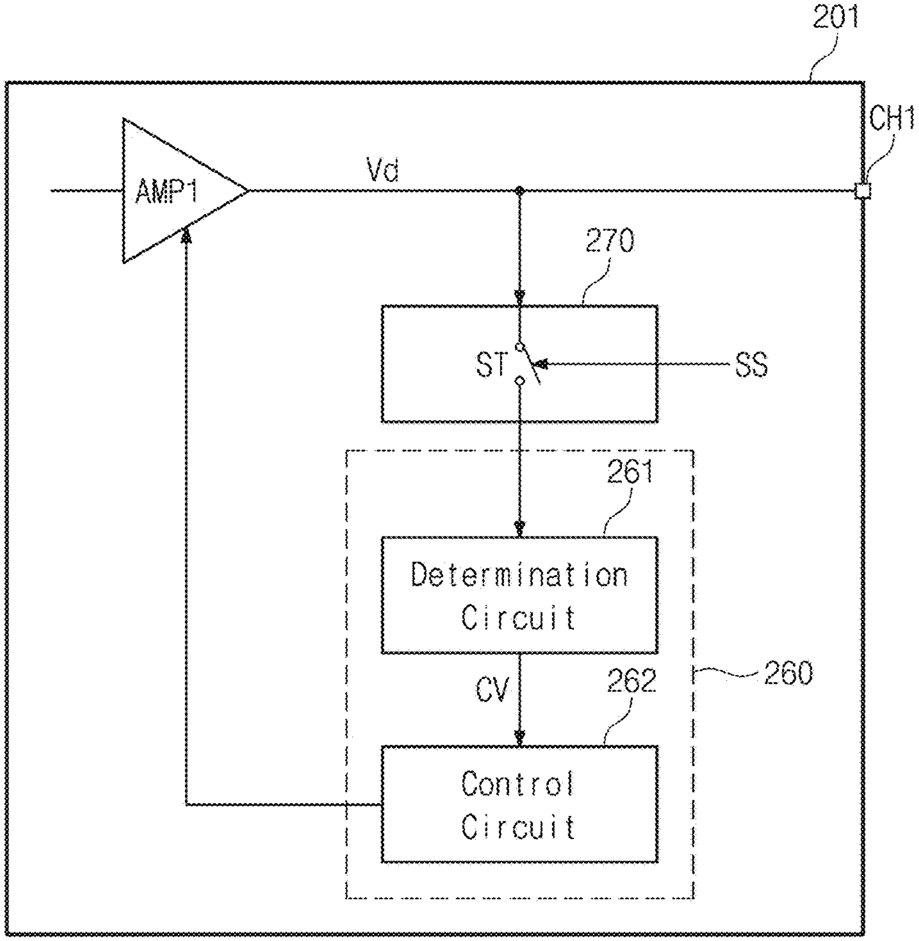
FIG. 8 is a block diagram illustrating an output buffer unit, a switching circuit, and a current control unit according to one or more embodiments of the present disclosure.

FIG. 8 is a block diagram illustrating an output buffer unit, a switching circuit, and a current control unit according to one or more embodiments of the present disclosure.

Referring to FIG. 8, a data driving circuit 201 may further include a switching circuit 270 between the output buffer unit 250 and the current control unit 260.

The switching circuit 270 may be disposed between the first channel CH1 and the determination circuit 261. A structure in which the first channel CH1 is connected to the switching circuit 270 is illustrated in FIG. 8 as an example. However, the present disclosure is not limited thereto. For example, some or all of the plurality of channels CH1 to CHk may be connected to the switching circuit 270.

As an example according to one or more embodiments of the present disclosure, the switching circuit 270 may include a switching element ST connected to the first channel CH1. The switching element ST may be turned on or turned off in response to a switching signal SS. The switching signal SS may be a signal that is provided from the driving controller 100 (e.g., refer to FIG. 3). The switching signal SS may be a signal that is activated or deactivated by selection of the user or the operator. For example, when the operator selects an option for activating the determination circuit 261 for the purpose of the initial setting of the current control signal CCS to be supplied to the output buffer unit 250, the switching element ST may be turned on in response to the switching signal SS. In this case, the determination circuit 261 may be connected to the first channel CH1 through the switching element ST. Accordingly, the determination circuit 261 may be electrically connected to the first channel CH1 to receive the data signal Vd and may determine the driving capability of the first output buffer AMP1 by utilizing (or using) a transition period of the data signal Vd. Afterwards, after the initial setting ends, when the operator deselects the option, the switching element ST may be turned off in response to the switching signal SS. In this case, the determination circuit 261 is not electrically connected to the first channel CH1 by the switching element ST. Accordingly, after the initial setting, the determination circuit 261 may not act as the load of the first channel CH1. Accordingly, even though the determination circuit 261 is added, the load of the first channel CH1 may be prevented from increasing.

Alternatively, the switching signal SS may be activated every preset period, that is, periodically. In this case, the determination circuit 261 may periodically determine the driving capability of the output buffer unit 250.

Figure 9:
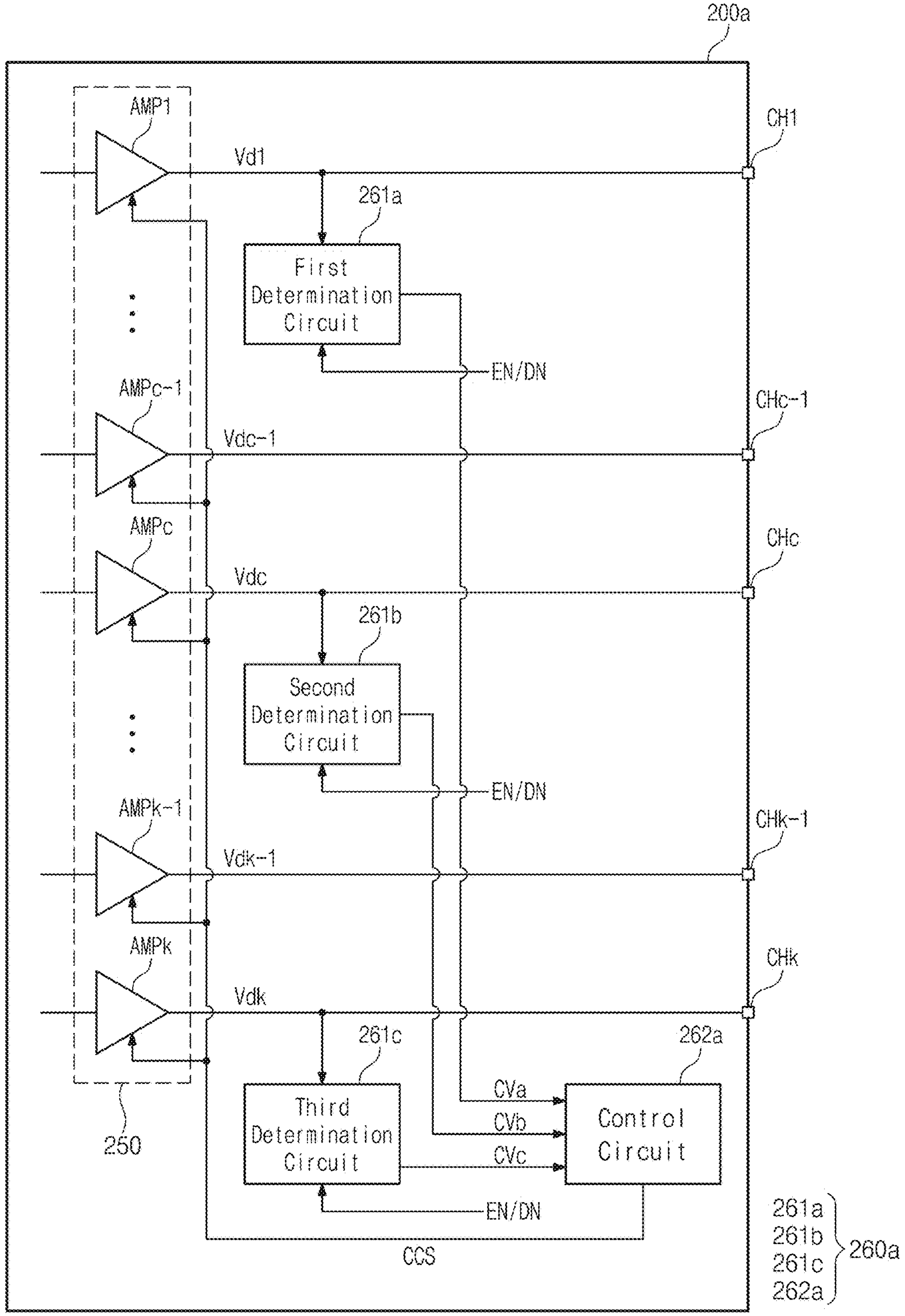
FIG. 9 is a block diagram illustrating an output buffer unit and a current control unit according to one or more embodiments of the present disclosure.

FIG. 9 is a block diagram illustrating an output buffer unit and a current control unit according to one or more embodiments of the present disclosure.

Referring to FIG. 9, a data driving circuit 200*a* includes a current control unit 260*a* connected to some of channels CH1 to CHc-1 and CHc to CHk-1, and CHk. The current control unit 260*a* includes a first determination circuit 261*a*, a second determination circuit 261*b*, a third determination circuit 261*c*, and a control circuit 262*a*. A structure in which the current control unit 260*a* is connected to three channels (i.e., the first channel CH1, the second channel CHc, and the third channel CHk) from among the channels CH1 to CHc-1 and CHc to CHk-1, and CHk is illustrated in FIG. 9. However, the present disclosure is not limited thereto. For example, the current control unit 260*a* may be connected to all the channels CH1 to CHc-1 and CHc to CHk-1, and CHk or may be connected to one or more other suitable channels only.

Herein, the first and third channels CH1 and CHk may be outermost channels from among the channels CH1 to CHc-1 and CHc to CHk-1, and CHk, and the second channel CHc may be a channel disposed at the center of the channels CH1 to CHc-1 and CHc to CHk-1, and CHk. The output buffer unit 250 may include a plurality of output buffers AMP1 to AMPc-1, AMPc to AMPk-1, and AMPk respectively connected to the channels CH1 to CHc-1 and CHc to CHk-1, and CHk. For convenience of description, an output buffer connected to the first channel CH1 may be referred to as a "first output buffer AMP1", an output buffer connected to the second channel CHc may be referred to as a "second output buffer AMPc", and an output buffer connected to the third channel CHk may be referred to as a "third output buffer AMPk".

The first determination circuit 261*a* is connected to the first channel CH1 to receive a first data signal Vd1 and determines the driving capability of the first output buffer AMP1 by utilizing (or using) a transition period of the first data signal Vd1. The second determination circuit 261*b* is connected to the second channel CHc to receive a second data signal Vdc and determines the driving capability of the second output buffer AMPc by utilizing (or using) a transition period of the second data signal Vdc. The third determination circuit 261*c* is connected to the third channel CHk to receive a third data signal Vdk and determines the driving capability of the third output buffer AMPk by utilizing (or using) a transition period of the third data signal Vdk.

According to one or more embodiments, the first determination circuit 261*a* performs the counting operation during the transition period of the first data signal Vd1. That is, the first determination circuit 261*a* counts the duration of the transition period of the first data signal Vd1 and outputs a counting result as a first counting value CVa (or referred to as a "first result value"). According to one or more embodiments, the second determination circuit 261*b* performs the counting operation during the transition period of the second data signal Vdc. That is, the second determination circuit 261*b* counts the duration of the transition period of the second data signal Vdc and outputs a counting result as a second counting value CVb (or referred to as a "second result value"). According to one or more embodiments, the third determination circuit 261*c* performs the counting operation during the transition period of the third data signal Vdk. That is, the third determination circuit 261*c* counts the duration of the transition period of the third data signal Vdk and outputs a counting result as a third counting value CVc (or referred to as a "third result value").

Each of the first to third determination circuits 261*a*, 261*b*, and 261*c* may receive the enable signal EN or the disable signal DN from the driving controller 100 (e.g., refer to FIG. 3). Each of the first to third determination circuits 261*a*, 261*b*, and 261*c* may be activated in response to the enable signal EN and may be deactivated in response to the disable signal DN. The enable signal EN and the disable signal DN may be signals that are activated or deactivated by selection of the user or the operator.

Each of the first to third determination circuits 261*a*, 261*b*, and 261*c* may be similar in structure to the determination circuit 261 illustrated in FIG. 6A, and thus, additional description associated with the first to third determination circuits 261*a*, 261*b*, and 261*c* may be omitted to avoid redundancy.

The control circuit 262*a* receives the first to third counting values CVa, CVb, and CVc from the first to third determination circuits 261*a*, 261*b*, and 261*c*, respectively. The control circuit 262*a* outputs the current control signal CCS for adjusting the driving capabilities of the plurality of output buffers AMP1 to AMPc-1, AMPc to AMPk-1, and AMPk, based on the first to third counting values CVa, CVb, and CVc. The control circuit 262*a* may be connected in common to the plurality of output buffers AMP1 to AMPc-1, AMPc to AMPk-1, and AMPk and may supply the current control signal CCS in common to the plurality of output buffers AMP1 to AMPc-1, AMPc to AMPk-1, and AMPk.

The control circuit 262*a* may compare each of the first to third counting values CVa, CVb, and CVc with a threshold range (e.g., a preset threshold range) and may adjust the current control signal CCS depending on comparison results. For example, when all the first to third counting values CVa, CVb, and CVc exist (or are) within the threshold range, the control circuit 262*a* may output the current control signal CCS with a reference value (e.g., a preset reference value). According to one or more embodiments, when at least one of the first to third counting values CVa, CVb, and CVc (i.e., at least one of the first counting value CVa, the second counting value CVb, or the third counting value CVc) is out of (or outside) the threshold range, the control circuit 262*a* may output the current control signal CCS with a compensation value different from the reference value.

When the plurality of output buffers AMP1 to AMPc-1, AMPc to AMPk-1, and AMPk receives the current control signal CCS with the compensation value, the driving capabilities of the plurality of output buffers AMP1 to AMPc-1, AMPc to AMPk-1, and AMPk may be compensated for.

As described above, as the current control unit 260*a* is connected to some channels CH1, CHc, and CHk from among the channels CH1 to CHc-1 and CHc to CHk-1, and CHk of the data driving circuit 200*a*, the current control unit 260*a* may directly measure the driving capability of the data driving circuit 200*a*. Also, as the driving capability of the data driving circuit 200*a* is compensated for based on a measured result, the driving intensity of the data driving circuit 200*a* may be optimized or improved. Also, when the data driving circuit 200*a* operates with the optimal or improved driving intensity, a power may be prevented from being unnecessarily consumed. This may mean that power consumption is optimized or reduced.

Figure 10:
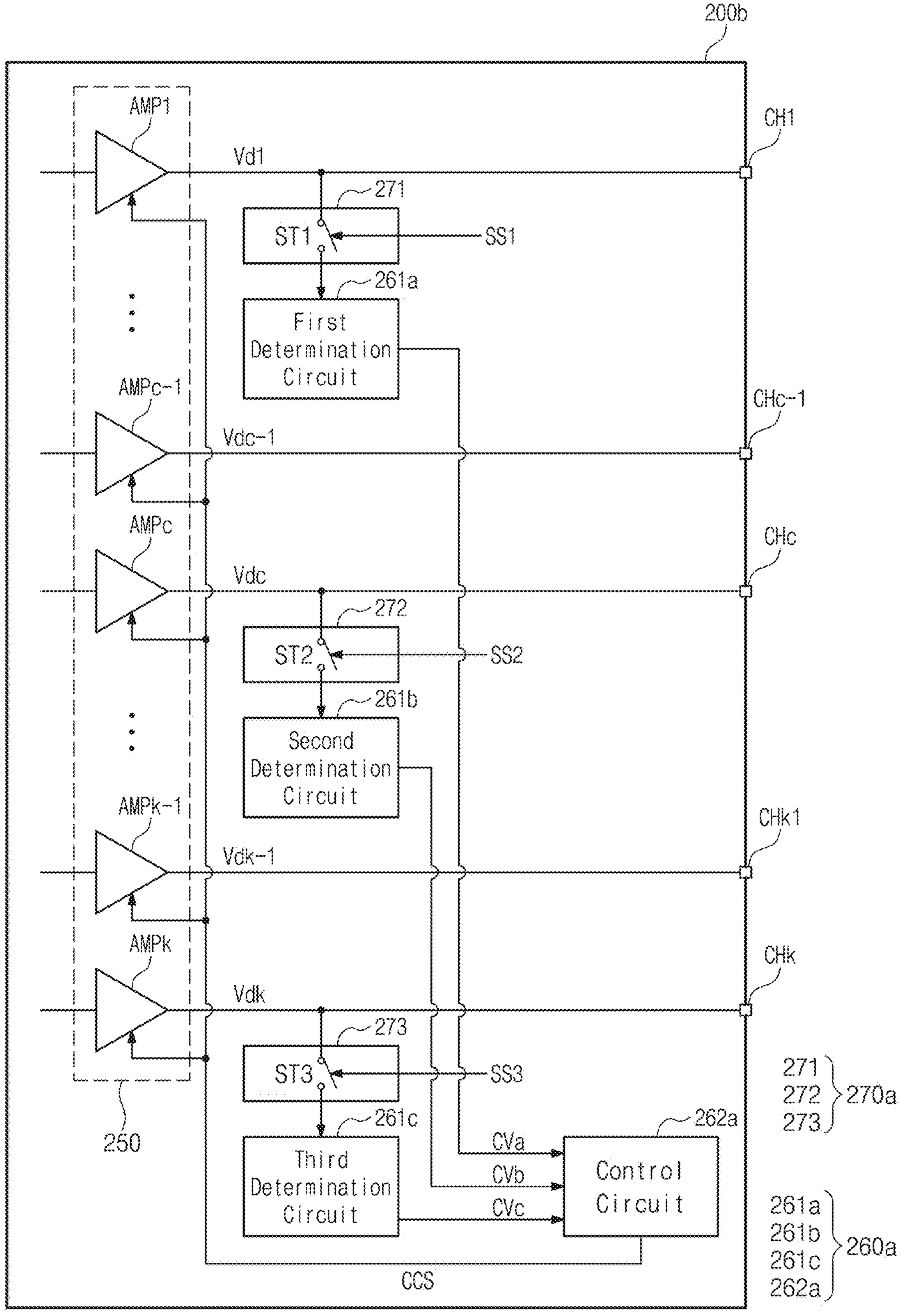
FIG. 10 is a block diagram illustrating an output buffer unit, a switching circuit, and a current control unit according to one or more embodiments of the present disclosure.

FIG. 10 is a block diagram illustrating an output buffer unit, a switching circuit, and a current control unit according to one or more embodiments of the present disclosure.

Referring to FIG. 10, a data driving circuit 200*b* may further include a switching circuit 270*a* between the output buffer unit 250 and the current control unit 260*a*.

The switching circuit 270*a* may include a first switching circuit 271 connected between the first channel CH1 and the first determination circuit 261*a*, a second switching circuit 272 connected between the second channel CHc and the second determination circuit 261*b*, and a third switching circuit 273 connected between the third channel CHk and the third determination circuit 261*c*. A structure in which the first to third switching circuits 271, 272, and 273 are respectively connected to the first to third channels CH1, CHc, and CHk is illustrated in FIG. 10 as an example. However, the present disclosure is not limited thereto. For example, all the channels CH1 to CHk may be connected to the switching circuit 270*a*.

As an example of the present disclosure, the first switching circuit 271 may include a first switching element ST1 connected to the first channel CH1. The first switching element ST1 may be turned on or turned off in response to a first switching signal SS1. The second switching circuit 272 may include a second switching element ST2 connected to the second channel CHc. The second switching element ST2 may be turned on or turned off in response to a second switching signal SS2. The third switching circuit 273 may include a third switching element ST3 connected to the third channel CHk. The third switching element ST3 may be turned on or turned off in response to a third switching signal SS3. The first to third switching signals SS1, SS2, and SS3 may be signals which are provided from the driving controller 100 (e.g., refer to FIG. 3). The first to third switching signals SS1, SS2, and SS3 may be signals that are activated or deactivated by selection of the user or the operator. Alternatively, the first to third switching signals SS1, SS2, and SS3 may be activated every preset period, that is, periodically. In this case, the first to third determination circuits 261*a*, 261*b*, 261*c* may periodically determine the driving capability of the output buffer unit 250.

When the first to third switching circuits 271, 272, and 273 are connected to the first to third determination circuits 261*a*, 261*b*, 261*c*, respectively, the first to third determination circuits 261*a*, 261*b*, 261*c* may not act as loads of the first to third channels CH1, CHc, and CHk. Accordingly, even though the first to third determination circuits 261*a*, 261*b*, 261*c* are added, the loads of the first to third channels CH1, CHc, and CHk may be prevented from increasing.

According to one or more embodiments of the present disclosure, the driving capability of a data driving circuit may be directly measured by connecting some or all of channels of the data driving circuit to a current control unit. Also, the driving intensity of the data driving circuit may be optimized or improved by compensating for the driving capability of the data driving circuit based on a measured result.

In addition, when the data driving circuit operates with the optimal or improved driving intensity, a power may be prevented from being unnecessarily consumed. This may mean that power consumption is optimized or reduced.

While the present disclosure has been described with reference to embodiments thereof, it will be apparent to those of ordinary skill in the art that various changes and modifications may be made thereto without departing from the spirit and scope of the present disclosure as set forth in the following claims and their equivalents.

What is claimed is:

1. A display device comprising:
- a display panel configured to display an image by utilizing a data signal;
- a data driving circuit configured to supply the data signal to the display panel through a channel; and
- a driving controller configured to control the data driving circuit,
- wherein the data driving circuit comprises:
  - an output buffer configured to output the data signal to the channel coupled to an output of the output buffer;
  - a determination circuit connected to the channel at the output of the output buffer and receives the data signal output from the output buffer, the determination circuit comprising:
    - a comparator outputting a comparison result generated by comparing the data signal with a threshold voltage; and
    - a counting circuit measuring a duration of a transition period of the data signal based on the comparison result and outputting counting values corresponding to the duration of the transition period; and
  - a control circuit coupled to an output of the determination circuit and receives the counting values from the determination circuit, the control circuit compares the counting values with a threshold range and outputs a current control signal adjusted according to a result of comparing the counting values with the threshold range to the output buffer.

2. The display device of claim 1, wherein the transition period includes:
- a rising transition period set to a time period from a first threshold point where the data signal reaches a low threshold voltage to a second threshold point where the data signal reaches a high threshold voltage; and
- a falling transition period set to a time period from a third threshold point where the data signal reaches the high threshold voltage to a fourth threshold point where the data signal reaches the low threshold voltage.

3. The display device of claim 2, wherein the comparator comprises:
- a first comparator configured to compare the data signal and the high threshold voltage to output a first comparison result; and a second comparator configured to compare the data signal and the low threshold voltage to output a second comparison result, and wherein the counting circuit is configured to determine a counting start point and a counting end point by utilizing the first and second comparison results.

4. The display device of claim 2, wherein the counting circuit is configured to:

output a first counting value by counting a duration of the rising transition period; and output a second counting value by counting a duration of the falling transition period.

5. The display device of claim 4, wherein the control circuit is configured to:

compare the first and second counting values with the threshold range;

when all the first and second counting values are within the threshold range, output the current control signal with a reference value; and when at least one of the first counting value or the second counting value is outside the threshold range, output the current control signal with a compensation value different from the reference value.

6. The display device of claim 1, wherein the transition period is set to a time period from a first threshold point where the data signal reaches a low threshold voltage to a second threshold point where the data signal reaches a high threshold voltage.

7. The display device of claim 6, wherein the comparator comprises:

a first comparator configured to compare the data signal and the high threshold voltage to output a first comparison result; and a second comparator configured to compare the data signal and the low threshold voltage to output a second comparison result, and wherein the counting circuit is configured to determine a counting start point and a counting end point by utilizing the first and second comparison results.

8. The display device of claim 6, wherein the control circuit is configured to:

compare the counting value with the threshold range;

when the counting value is within the threshold range, output the current control signal with a reference value; and when the counting value is outside the threshold range, output the current control signal with a compensation value different from the reference value.

9. The display device of claim 1, wherein the determination circuit is configured to receive an enable signal or a disable signal from the driving controller, to be activated in response to the enable signal, and to be deactivated in response to the disable signal.

10. The display device of claim 1, wherein the data driving circuit further comprises:

a switching circuit configured to switch a connection between the channel and the determination circuit in response to a switching signal.

11. The display device of claim 10, wherein the driving controller is configured to provide the switching signal to the switching circuit.

12. The display device of claim 1, wherein the channel comprises a plurality of channels, wherein the output buffer comprises a plurality of output buffers respectively connected to the plurality of channels, and wherein the determination circuit is connected to some channels from among the plurality of channels.

13. The display device of claim 12, wherein the determination circuit comprises:

a first determination circuit connected to a first channel from among the plurality of channels, and configured to output a first result value associated with a transition period of a first data signal output to the first channel;

a second determination circuit connected to a second channel from among the plurality of channels, and configured to output a second result value associated with a transition period of a second data signal output to the second channel; and a third determination circuit connected to a third channel from among the plurality of channels, and configured to output a third result value associated with a transition period of a third data signal output to the third channel.

14. A display device comprising:

a display panel configured to display an image by utilizing a data signal;

a data driving circuit configured to supply the data signal to the display panel through a channel; and a driving controller configured to control the data driving circuit, wherein the data driving circuit comprises:

an output buffer configured to output the data signal to the channel;

a determination circuit connected to the channel, and configured to receive the data signal and to determine a driving capability of the output buffer by utilizing a transition period of the data signal; and a control circuit configured to output a current control signal for adjusting a driving intensity of the output buffer to the output buffer depending on a determination result of the determination circuit, wherein the channel comprises a plurality of channels, wherein the output buffer comprises a plurality of output buffers respectively connected to the plurality of channels, wherein the determination circuit is connected to some channels from among the plurality of channels, wherein the determination circuit comprises:

a first determination circuit connected to a first channel from among the plurality of channels, and configured to output a first result value associated with a transition period of a first data signal output to the first channel;

a second determination circuit connected to a second channel from among the plurality of channels, and configured to output a second result value associated with a transition period of a second data signal output to the second channel; and a third determination circuit connected to a third channel from among the plurality of channels, and configured to output a third result value associated with a transition period of a third data signal output to the third channel, and wherein the control circuit is configured to:

compare each of the first to third result values with a threshold range;

when all of the first to third result values are within the threshold range, output the current control signal with a reference value to the plurality of output buffers; and when at least one of the first result value, the second result value, or the third result value is outside the threshold range, output the current control signal with a compensation value different from the reference value to the plurality of output buffers.

15. An electronic device including a display device, the display device comprising:

a display panel configured to display an image by utilizing a data signal;

a data driving circuit configured to supply the data signal to the display panel through a channel; and a driving controller configured to control the data driving circuit, wherein the data driving circuit comprises:

an output buffer configured to output the data signal to the channel;

a determination circuit connected to the channel, and configured to receive the data signal and to determine a driving capability of the output buffer by utilizing a transition period of the data signal; and a control circuit configured to output a current control signal for adjusting a driving intensity of the output buffer to the output buffer depending on a determination result of the determination circuit, wherein the channel comprises a plurality of channels, wherein the output buffer comprises a plurality of output buffers respectively connected to the plurality of channels, wherein the determination circuit is connected to some channels from among the plurality of channels, wherein the determination circuit comprises:

a first determination circuit connected to a first channel from among the plurality of channels, and configured to output a first result value associated with a transition period of a first data signal output to the first channel;

a second determination circuit connected to a second channel from among the plurality of channels, and configured to output a second result value associated with a transition period of a second data signal output to the second channel; and a third determination circuit connected to a third channel from among the plurality of channels, and configured to output a third result value associated with a transition period of a third data signal output to the third channel, wherein the first and third channels are outermost channels from among the plurality of channels, and wherein the second channel is a channel located at a center from among the plurality of channels.

16. The display device of claim 13, wherein each of the first to third determination circuits receives an enable signal or a disable signal from the driving controller, is activated in response to the enable signal, and is deactivated in response to the disable signal.

17. The display device of claim 13, wherein the data driving circuit further comprises:

a first switching circuit configured to switch a connection between the first channel and the first determination circuit in response to a first switching signal;

a second switching circuit configured to switch a connection between the second channel and the second determination circuit in response to a second switching signal; and a third switching circuit configured to switch a connection between the third channel and the third determination circuit in response to a third switching signal.

18. The display device of claim 17, wherein the driving controller is configured to provide the first to third switching signals to the data driving circuit.

19. The display device of claim 12, wherein the control circuit is configured to:

supply the current control signal to the plurality of output buffers in common.

* * * * *